United States Patent
Kuiper et al.

(10) Patent No.: US 9,861,854 B2
(45) Date of Patent: Jan. 9, 2018

(54) VIRTUAL GOLF SYSTEM AND METHODS

(71) Applicants: Jan Lucas Kuiper, Gainesville, GA (US); Albertus Maria Claessen, Oakwood, GA (US)

(72) Inventors: Jan Lucas Kuiper, Gainesville, GA (US); Albertus Maria Claessen, Oakwood, GA (US)

(*) Notice: Subject to any disclaimer, the term of this patent is extended or adjusted under 35 U.S.C. 154(b) by 0 days.

(21) Appl. No.: 15/462,628

(22) Filed: Mar. 17, 2017

(65) Prior Publication Data
US 2017/0282010 A1 Oct. 5, 2017

Related U.S. Application Data

(60) Provisional application No. 62/315,813, filed on Mar. 31, 2016.

(51) Int. Cl.
| | | |
|---|---|---|
| *A63B 67/02* | (2006.01) | |
| *A63F 7/20* | (2006.01) | |
| *A63B 24/00* | (2006.01) | |
| *A63B 43/00* | (2006.01) | |

(52) U.S. Cl.
CPC ........ *A63B 24/0021* (2013.01); *A63B 43/004* (2013.01); *A63B 2024/0031* (2013.01); *A63B 2024/0034* (2013.01); *A63B 2220/12* (2013.01); *A63B 2220/62* (2013.01)

(58) Field of Classification Search
None
See application file for complete search history.

(56) References Cited

U.S. PATENT DOCUMENTS

| | | | |
|---|---|---|---|
| 3,633,917 A | 1/1972 | Anderson | |
| 5,423,549 A | 6/1995 | Englmeier | |
| 5,910,057 A | 6/1999 | Quimby et al. | |
| 6,106,409 A | 8/2000 | Jackson | |
| 6,113,504 A | 9/2000 | Kuesters | |
| 6,634,959 B2 | 10/2003 | Kuesters | |
| 6,663,498 B2 | 12/2003 | Stipan | |
| 6,705,942 B1 * | 3/2004 | Crook | A63B 24/0003 463/3 |
| 7,891,666 B2 * | 2/2011 | Kuenzler | A63B 43/00 273/108 |
| 8,002,645 B2 * | 8/2011 | Savarese | A63B 24/0021 473/155 |
| 9,339,697 B2 | 5/2016 | Luciano et al. | |

(Continued)

*Primary Examiner* — Ronald Laneau
(74) *Attorney, Agent, or Firm* — Theodore Heske, III

(57) ABSTRACT

Virtual golf system for playing golf, comprising a plurality of trackable golf balls, wherein each golf ball comprises transmitting means for broadcasting electromagnetic beacon signals for detecting a position of the golf ball, a position determination unit comprising three receiving antenna's arranged for receiving beacon signals broadcasted by any of said plurality of trackable golf balls, and wherein said position determination unit is arranged to determine a position of said golf ball on a driving range based on time differences of a broadcasted beacon signal received by said receiving antenna's. A plurality of trackable golf balls and a plurality of players may be active at the same time. Trackable golf balls may be paired with specific players. A game controller advances a virtual game of golf each time a trackable golf ball is stroked by a player.

17 Claims, 4 Drawing Sheets

(56) References Cited

U.S. PATENT DOCUMENTS

| | | | |
|---|---|---|---|
| 9,616,328 B2* | 4/2017 | Song | G06Q 50/10 |
| 2004/0014536 A1 | 1/2004 | Kuesters | |
| 2005/0085316 A1* | 4/2005 | Barr | A63B 37/0003 |
| | | | 473/353 |
| 2005/0227792 A1 | 10/2005 | McCreary et al. | |
| 2007/0049396 A1* | 3/2007 | Scheibe | A63B 47/02 |
| | | | 473/282 |
| 2011/0074665 A1* | 3/2011 | Konishi | A63F 13/02 |
| | | | 345/156 |
| 2011/0213474 A1* | 9/2011 | Jung | A63B 24/0021 |
| | | | 700/92 |
| 2012/0184340 A1* | 7/2012 | Jang | A63B 67/02 |
| | | | 463/2 |

\* cited by examiner

VIRTUAL GOLF SYSTEM AND METHODS

CROSS REFERENCE TO RELATED APPLICATIONS

This non-provisional application claims the benefit of prior filed U.S. provisional application No. 62/315,813, filed Mar. 31, 2016, entitled "ViReGo Virtual Reality Golf". This application also claims the benefit of prior filed Netherlands application No. 2018235, filed Jan. 26, 2017, entitled "Virtual golf system for playing golf as well as a corresponding method". U.S. Application No. 62/315,813, is incorporated herein by reference. Netherlands application no. 2018235 is incorporated herein by reference.

STATEMENT REGARDING FEDERALLY SPONSORED RESEARCH OR DEVELOPMENT

Not Applicable.

DESCRIPTION OF ATTACHED APPENDIX

Not Applicable.

BACKGROUND

The present invention is related to a virtual golf system for playing golf as well as a corresponding methods.

Different types of virtual golf systems are already known in the prior art. One of those systems is also referred to as a golf simulator. Here, a large screen is placed in front of a user, and the golf course is projected onto the large screen. The golf course is projected as if it is viewed by the user itself. This means that the displayed golf course is dynamic as it follows the user along the golf course.

Further, a net is placed right in front of the large screen for catching any golf balls hit by the user to prevent the screen from getting damaged by the golf balls. Finally, a tee position is created in front of the screen, which tee position is used for hitting a golf ball, by the user, towards the screen.

Whenever a golf ball is hit, from the tee position, its trajectory is determined using a camera unit. That is, the trajectory is calculated and then extrapolated in accordance with the golf course that is displayed on the screen. Of course, the ball will be captured by the net, but the calculated and extrapolated trajectory of the ball is taken into account for determining the next position of the golf ball in the golf course. Using the above described golf system, a user is able to hit golf balls without actually going outside to a golf course.

One of the challenges in these types of virtual golf systems is that they should mimic a regular golf game as good as possible. That is, a user playing golf with the virtual golf system should perceive the game in such a way as if he was playing it from a traditional golf course.

There is an unmet need, therefor, for a virtual golf system which closely resembles a standard golf game played on a traditional golf course.

SUMMARY

Embodiments of the present disclosure provides systems and methods for using golf balls that are actually hit by a player on a driving range, golf course, or any other suitable location hereafter referred to as driving range. The system uses the location of where each ball ends up on the driving range as input for a golf game. Each ball contains a transmitting device which transmits identity and status information of the balls. Direction finding receivers located on the driving range use the transmitted data in conjunction with a location server to determine the location, identity and status information of each ball.

Embodiments of the present disclosure use data from each ball and other data as input to software that that emulates a game on a fictitious or existing golf course situated anywhere in the world. The ball is placed on a hitting position that is designed to emulate various situations on the golf course and combines fairway, rough and sand areas (hereinafter referred to as a Hitspot).

Before each stroke, the player is shown on a monitor the view of the emulated golf course as seen from the point where the player is hitting the ball. The view includes all areas normally seen on a real course such as terrain slopes, roughs, hazards etc. The system may advise the player, based on handicaps and player statistics, on the best approach, club to use, direction and other relevant information. The location resulting from the hit is used to calculate where the golf ball has come to rest on the virtual golf course. This information is used to adjust for terrain conditions (slope, roughs and sand traps) and to determine the hitting position on the Hitspot from where the next ball must be hit. The golfer then decides on his next play (move ball, go back to previous position, etc.) based on the rules of the game and course. The golfer enters the decision and the system calculates the location for the next hit. The viewpoint for the game and relevant information (distance to the hole, simulated weather conditions etc.) are displayed on the monitor next to the Hitspot as a virtual reality 3D view or a map of the golf course or both.

Embodiments of the present disclosure provide a system for maintaining statistics of the player's golf results and the conditions of the game (location, temperature, weather etc.). The system also provides for the emulation of the putting game on the green. The system calculates where on the (emulated) green the ball ends up. The player can now continue the game on a putting green either located near the driving range or any putting green in the world with a compatible system. The system will ask the player to place the ball on a coordinate on the green corresponding to the calculated location of the ball and then tracks the number of hits the player needs to sink the ball in the hole.

In other embodiments, instead of emulating a golf course, the disclosure also provides for designating target areas for the player to practice his golf swing and use the system for (competitive) games using that concept. Game status and player data may be stored either in the cloud or on a player's mobile device. A player may suspend the game at any point and continue at a later point in time in any location anywhere in the world that has a compatible system. Systems of the disclosure provide for multiple players to participate in a tournament. Players may participate from multiple locations. Conditions at various locations such as weather and time of day can differ at locations. Actual weather data input such as wind speed etc. can be used by the software to compensate for the weather conditions.

Advantages of the various embodiments of the disclosure are:
1. The system may be installed on existing driving ranges without major infrastructure adaptations.
2. The system reports the exact distances traveled by each ball including roll and spin effects.
3. The system reports ball travel distance immediately.
4. The system reports the location of any ball that has been hit.

5. The system may simulate a golf game played on a fictitious golf course or any existing golf course (including putting).
6. The system may automatically calculate results based on, amongst others, the Stableford system.
7. The system takes into consideration the handicap of the player.
8. The system takes into consideration the tee off position of the player.
9. The system allows teeing off from a tee.
10. The system allows play from the fairway.
11. The system allows play from sand traps or bunkers.
12. The system allows play from the rough.
13. The system takes into consideration out-of-bounds shots.
14. The system allows playing 9 or 18 holes.
15. The system allows any combination of players and games on a hitspot.
16. The system allows several players to compete with each other as in a real golf game, but also games as farthest hit, most precise hit to predetermined targets, etc.
17. The system allows practicing all shots with driver, woods and irons with immediate and very accurate result reporting.
18. The system allows the collection hitting data of players on the driving range. Trends may be derived and possible recommendations for improvement may be made based on the data.
19. The system allows installing tee off units for more comfort and all weather playing.
20. The system allows interrupting the game at any time and allows it to continue where it was left of at a later stage, even at another location in the world provided that a compatible system is installed.
21. The system allows gradual extension by adding additional hitspots as needed.

In a first aspect of the invention, there is provided a virtual golf system for playing golf, comprising:
 a) a plurality of trackable golf balls, wherein each golf ball comprises transmitting means for broadcasting beacons for detecting a position of the golf ball;
 b) a position determination unit comprising three receiving units, comprising, for example, receiving antenna's, arranged for receiving beacons broadcasted by any of said plurality of trackable golf balls and for determining a position of said golf ball on a driving range based on a broadcasted beacon received by said receiving units;
 c) a golf computer assembly, comprising:
  i) a display device for displaying a virtual golf course and for indicating a golf ball position on said virtual golf course;
  ii) a computing unit arranged for receiving said determined position of said golf ball on said driving range from said position determination unit and for:
   A) controlling said golf ball position on said display device in accordance with said determined position of said golf ball on said driving range;

One of the insights of the inventors is that the trajectory of the ball should not be extrapolated to improve the resemblance of the virtual golf system with an actual golf game. As such, the inventors found that the golf ball should not be stopped with a net, but the golf ball should travel its own course. As such, there is no need for a camera unit for determining, and extrapolating, the trajectory of the golf ball.

There is, however, a need for determining the location of a golf ball that is hit by a user. The determined location of the golf ball can then be used as an input to the virtual golf course. That is, the position of the golf ball inside the virtual golf game is recalculated based on the determined location of the golf ball that was struck by the user.

In order to be able to determine the position of the golf ball, the inventors have found that the golf ball should transmit electromagnetic beacon signals. The beacon signals may be transmitted in regular time intervals, having the same or increasing transmit powers, and using any available technology. Technologies that may be used include Zigbee, Ultra Wideband, ultra low power Bluetooth or similar.

Transmitted beacon signals are then used by a position determination unit to determine the actual position of the golf ball on a driving range. The position determination unit comprises three receiving units for receiving the beacons that were transmitted by the golf ball. Preferably, the receiving units are spread along the driving range such that they are sufficiently spaced apart. This increases the accuracy of determining the position of the golf ball. Even more receiving units may be deployed to further improve the accuracy.

A preferred embodiment of position determination of the trackable golf ball based upon propagation delays of the broadcasted beacon received by said receiving units. So, a first receiving unit initially receives a broadcasted beacon. The second receiving unit also receives the same broadcasted beacon however with a certain propagation delay with respect to the first receiving unit. The third receiving unit also receives the same broadcasted beacon however with another propagation delay with respect to the first receiving unit. The above mentioned propagation delays are then used as an input for determining the position of the golf ball on the driving range. The inventors have found that such a propagation delay related approach is more accurate compared to a triangulation approach in which the position of the golf ball is determined based on a received power amount of the broadcasted beacons at the receiving units.

Each of the receiving units is, preferably, synchronized in time to make sure that the propagation delays between the receiving moments of the broadcasted beacon at the different receiving units can be established accurately.

In another example, the display device is a head mounted augmented reality display. The advantage hereof is that the resemblance of the virtual golf system with the actual golf game is improved even further. For example, in case the user looks at the horizon, the virtual golf course may be projected in the augmented reality glass. In case the user is looking downwardly, i.e. towards the golf ball, it simply sees the ball laying on the driving range, i.e. without any augmented reality effects.

In a further example, the said virtual golf system comprises a ball pairing interface arranged for exchanging electromagnetic signals with a particular trackable golf ball; wherein said particular trackable golf ball comprises golf ball pairing means arranged for exchanging electromagnetic signals with said ball pairing interface for pairing said particular golf ball to be struck with said golf ball in said virtual golf course and wherein the pairing process is initiated with an electromagnetic signal.

The inventors have found that a golf ball should be paired with the virtual golf system before the user hits that particular ball. This ensures that the correct ball is used as an input to the virtual golf game.

The inventors have further found that a battery present in the golf balls for empowering the transmitting means should be preserved as much as possible. As such, it is not required that each ball transmits beacons all the time. The ball should, at least, transmit beacons whenever its position is to be determined. The advantage of this example is that the beacons start being transmitted upon completion of the pairing process.

The pairing process is thus completed by exchanging electromagnetic signals between the trackable golf ball and the ball pairing interface. As such, the trackable golf ball has means for actively transmitting an electromagnetic signal towards the ball pairing interface.

In a further example, each golf ball comprises a substantially closed inner housing, wherein said inner housing comprises a battery, said transmitting means, and two contact points, which contact points are situated opposite to each other, wherein said contact points can be used to charge said battery, wherein said virtual golf system further comprises: a charging tube comprising two electrodes situated in said charging tube and opposite to each other, wherein said charging tube is arranged to receive said inner housing such that said contact points of said inner housing are in contact with two electrodes, respectively.

It is noted that the batteries, or even all electronics, present in the trackable gold ball can be recycled. In order to do so, an inner housing remover may be required. Such a device is arranged to make a hole in the golf ball, for example with a round saw, laser beam, water jets, etc. The diameter of the hole is a little bit bigger than the maximum diameter of the inner housing. This ensures that the inner housing can be removed from the golf ball.

The contact points may protrude from the inner housing slightly. This aspect can be used to make sure that the orientations of the inner housing entering the charging tube is always the same. The shape of the inner housing is made in such a way that the contact points are directed to the electrodes present in the charging tube.

Once an inner housing has been placed inside the charging tube, the electrodes may be provided with a charging voltage. The charging voltage in combination with the electrodes make sure that the battery inside the inner housing gets charged.

In a second aspect, the invention provides for a method of playing virtual golf using a virtual golf system in accordance with any of the examples as provided above, wherein said method comprises the steps of: receiving, by said position determination unit, beacons broadcasted by any of said plurality of trackable golf balls; determining, by said position determination unit, a position of said golf ball on a driving range based on said received broadcasted beacon; displaying, by said display device, a virtual golf course and indicating a golf ball position on said virtual golf course; controlling, by said computing unit, said golf ball position of said display device in accordance with said determined position of said golf ball on said driving range; controlling, by said computing unit, said deformation of said plane in accordance with said determined position of said golf ball in said virtual golf course.

In yet a further example, said virtual golf system comprises a ball pairing interface arranged for exchanging electromagnetic signals with a particular trackable golf ball; wherein said particular trackable golf ball comprises golf ball pairing means arranged for exchanging electromagnetic signals with said ball pairing interface for pairing said particular golf ball to be struck with said golf ball in said virtual golf course, said method comprising the steps of: pairing, by said ball pairing interface, said particular golf ball to be struck with said golf ball in said virtual golf course.

The above-mentioned and other features and advantages of the disclosure will be best understood from the following description referring to the attached drawings. In the drawings, like reference numerals denote identical parts or parts performing an identical or comparable function or operation.

After investigation, applicants have determined that there is no information missing from page 10 of the specification in the Image File Wrapper accessible from EFS-Web. As best as can be determined, when the source file of the specification was output by applicant's word processing software into PDF format, as required by the office, applicant's software created a page 10 with no visible text on it. Because of this, there is no text actually missing on page 10. Applicants therefore propose to cancel page 10 of the specification. Applicants believe that canceling page 10 of the specification is the only amendment needed.

BRIEF DESCRIPTION OF THE DRAWINGS

These and other features, aspects, and advantages of the present invention will become better understood with regard to the following description, appended claims, and accompanying drawings where:

Figure 1A:
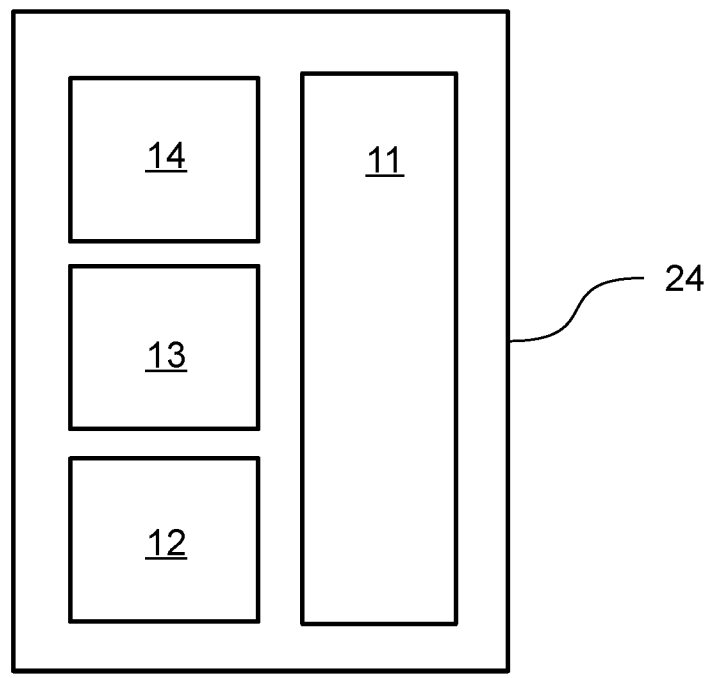
FIG. 1A shows an overhead plan view of a Hitspot comprising multiple regions of varied terrain for playing golf strokes.

LIST OF REFERENCE NUMBERS APPEARING IN THE FIGS.

1-Trackable golf ball for use with the disclosed virtual golf system
2-Antenna
3-Battery or other power source
4-Micro-controller
5-Transmitter
6-Detector and control interface
10-Portion of a golf facility
11-Fairway terrain
12-Rough terrain
13-Sandy terrain
14-Putting green terrain
21-Virtual golf system
22$a$, 22$b$,-first direction finding system, second direction finding system, . . .
23-Driving range network
24-Hitspot
24$a$, 24$b$, . . . , 24$n$-first Hitspot, second Hitspot, . . . , n'th Hitspot
25N-Hitspot network
25D-Hitspot display
25P-Hitspot processor/Game controller
25BPI-Hitspot ball pairing interface
26-Location server
27-Player data
28-Golf course database
29-System server
31-Position determination unit 32a, 32b, 32c, . . . , 32n-first direction finding receiver (DFR), second DFR, third DFR, . . . , n'th DFR 36-Direction finding signal processor and micro-controller 38-Synthesizer 39-Wired or wireless network

DESCRIPTION

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention can be practiced without these specific details. In other instances, well-known structures and devices are shown in block diagram form in order to facilitate describing the present invention.

FIG. 1A shows an overhead plan view of a hitspot 24 comprising multiple regions of varied terrain: fairway terrain 11; rough terrain 12; sandy terrain 13; putting terrain 14. Golf strokes can be played from each of the terrain regions. It can be understood that the term playing a golf stroke means striking a golf ball with a golf club, as is conventional activity in the game of golf Hitspot 24 is the location from where all the balls are played and may consist of multiple terrain regions from which balls can be hit towards an area suitable for that purpose such as a golf driving range. Fairway terrain 11 may be made with artificial or real grass as is common on a fairway of a conventional golf course. Rough terrain region 12 may be made with artificial or real grass as is common adjacent to the fairway grass area on a conventional golf course. Sandy terrain 13 may be configured to simulate commonly encountered bunkers and/or sand traps on a conventional golf course. This arrangement of varied terrains comprising hitspot 24 creates the possibility of practicing all golf strokes from the hitbox that are commonly used on a conventional golf course.

Figure 1B:
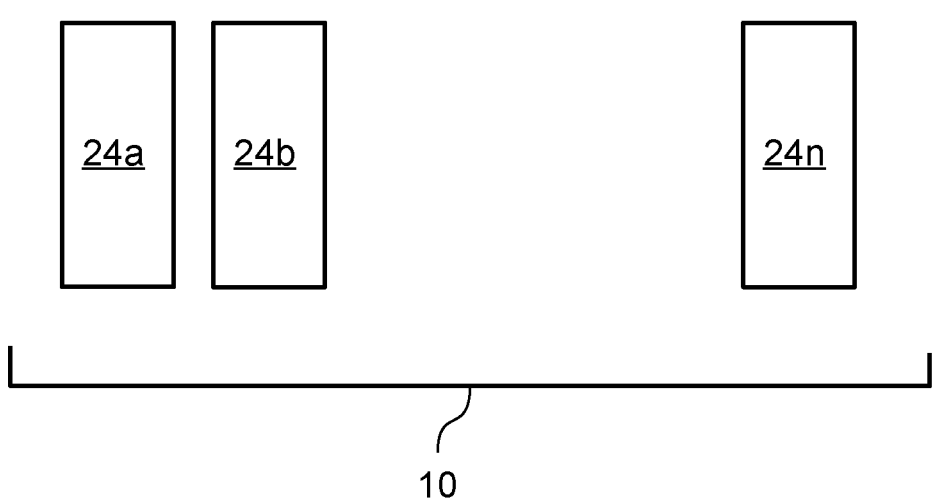
FIG. 1B shows an schematic representation of a portion of a golf facility comprising a plurality of Hitspots.

FIG. 1B shows a schematic representation of a portion 10 of a driving range or golf facility comprising a plurality of hitspots 24a, 24b, . . . , 24n. Multiple players can be active simultaneously on more than one of the plurality of hitspots. In addition, hitspots may be embodied in a static configuration or a flexible configuration. In the flexible configuration of a hitspot, the terrain regions may be constructed in such a way that they can be placed mechanically under an inclination simulating the inclination of certain areas in a conventional golf course. The degree of inclination as well as the direction of inclination can be set under the control of a system controller. In the static configuration of a hitspot, the terrain regions conform to the local terrain features in a non-flexible way.

Figure 2:
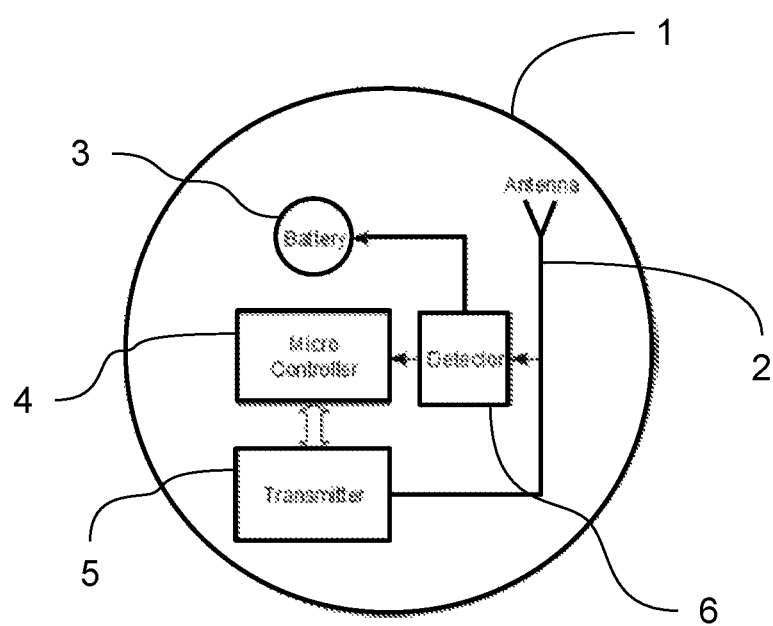
FIG. 2 shows an embodiment of a trackable golf ball in accordance with the present disclosure.

Turning now to FIG. 2, shown is an embodiment of a trackable golf ball 1 in accordance with the present disclosure. Trackable golf ball 1 is operable to transmit identity and status information at preconfigured intervals. Encapsulated in golf ball 1 is transmitting device consisting of: microcontroller 4; RF transmitter 5; antenna 2, battery or power source 3; and, detector and control interface 6. Externally the golf ball is identical in appearance, size, weight and mechanical characteristics to a conventional golf ball. Each trackable golf ball 1 may be identified by a characteristic text, logo, color or other trademark.

Trackable golf ball 1 is further characterized in that transmitter 5 may be activated by an electromagnetic signal, either low frequency near field coupled or radio frequency (RF), received over detector and control interface 6. After activation of the golf ball by the electromagnetic signal, various commands can be send to the golf ball using detector and control interface 6. Microcontroller 4 is operable to respond to commands using the RF transmitter 5. The transmitter may send golf ball identification data as well as status information, for example battery charge status, temperature or production date. During normal use, commands will activate the transmitter to send identification and status information at regular intervals for a pre-configured time period. The transmit intervals and parameters can be programmed to vary over time. In one embodiment transmissions may occur once per second for the first five minutes after activation and thereafter once per minute for the next 24 hour. Other transmission schedules are possible according to tracking system and application needs.

After production or at another convenient point in the supply chain, trackable golf ball 1 may be configured by commands over detector and control interface 6. Not all the information needs to be configured at the same point in time. For instance, identification and production date can be configured at production time and may be one-time programmable only. Transmit interval, power level and frequency may be programmable later in the supply chain and may vary depending on location (country) and intended use of the golf ball, for instance the time required to maintain short interval transmissions for location of the golf ball. An alternate embodiment of a trackable golf ball may use a rechargeable battery for powering the golf ball circuits. Recharging may be implemented using low frequency electromagnetic coupling over the detector and control interface. Continuous, high level power over this interface may activate the microcontroller circuit in the golf ball which then controls the charging of the golf ball battery.

Figure 3:
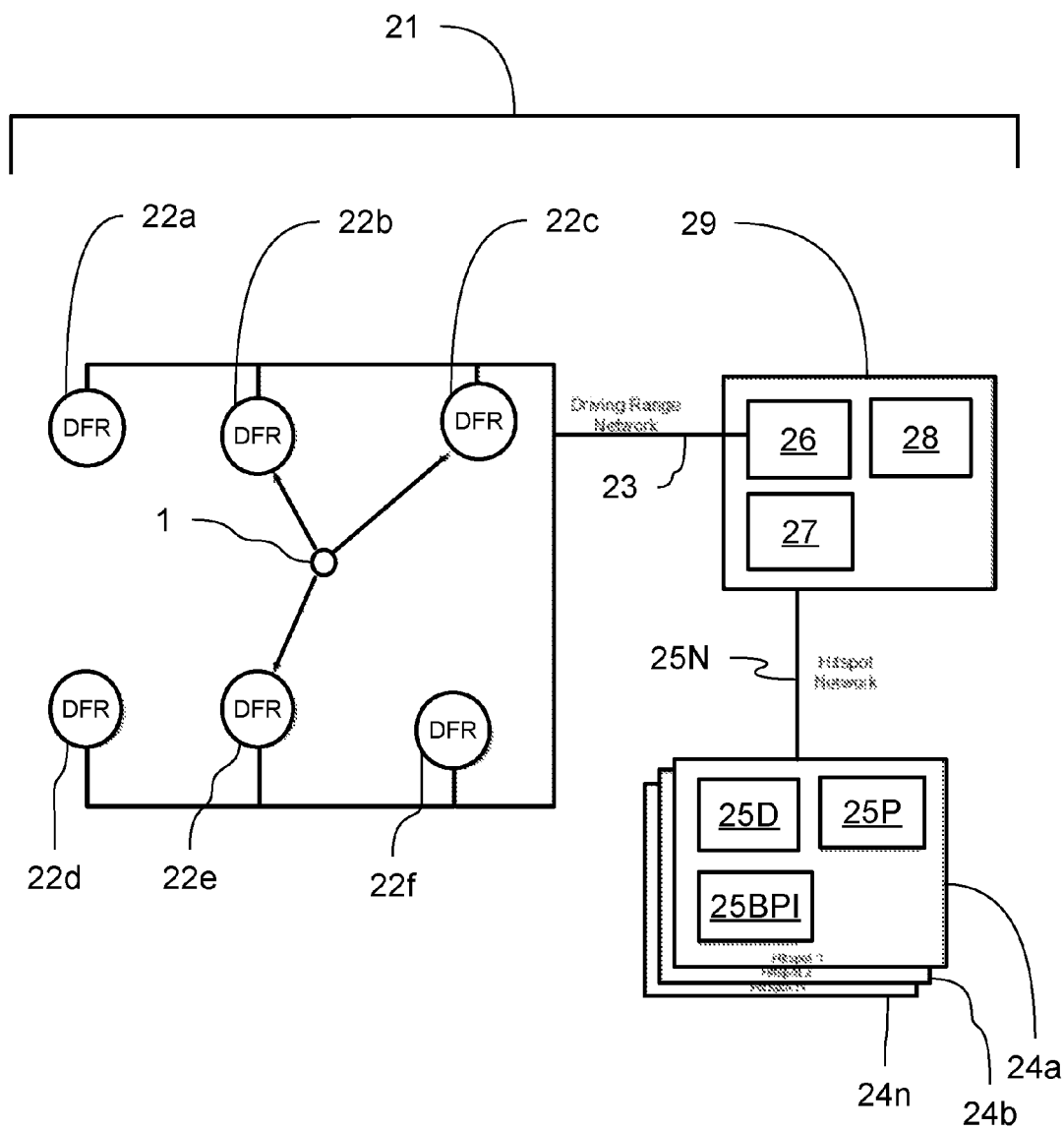
FIG. 3 shows a schematic view of an embodiment of a virtual golf system for playing golf in accordance with the present disclosure.

Turning now to FIG. 3, shown is a schematic view of an embodiment of a virtual golf system 21 for playing golf in accordance with the present disclosure. A plurality of direction finding receivers 22a, 22b, 22c, 22d, 22e and 22f are placed around the driving range. One or more hitspots 24a, 24b, . . . , 24n are disposed within the operational area of the plurality of direction finding receivers 22a, 22b, . . . , 22f. Trackable golf ball 1 is shown within the operational area of the virtual golf system. The exact location of the each of the plurality of direction finding receivers in relation to the driving range is recorded in system location server 26. In some embodiments each direction finding receiver determines the angle of the received signal relative to the orientation of the receiver. The angle information, the received message content and status information such as message timestamp may be sent to system location server 26. In other embodiments each direction finding receiver determines the phase of receieved RF signals from trackable golf ball 1. The phase information, the received message content and status information such as message timestamp may be sent sent to system location server 26. In still other embodiments each direction finding receiver may capture the time of arrival of received RF signals from trackable golf ball 1. The time-of-arrival information, received message content and status information such as message timestamp may be sent to system location server 26.

System location server 26 uses information received over driving range network 23 from the plurality of direction finding receivers 22a, 22b, . . . to calculate the position of trackable golf ball 1 on the driving range. A plurality of trackable balls may be played into the driving range at any time and each of the played golf balls is individually trackable.

Each hitspot 24*a*, 24*b*, . . . , 24*n* comprises: a display 25D for displaying information to one or more players using that hitspot; a processor 25P operable for running an interactive game application and a user interface; a ball paring interface 25BPI; and a bidirectional networked connection to a hitspot network 25N which transmits and receives data to and from system server 29.

Operation of the system according to FIG. 3 may proceed as follows. The player purchases or rents a supply of trackable golf ball that are going to be used in the game. Before every stroke, a ball is presented to ball pairing interface 25BPI at its respective hotspot. The player may present a ball to ball pairing interface 25BPI either manually or using an automated ball dispenser. Processor 25P then initializes the ball for the game, pairs the ball with the game and player and records the ball information. The player who is about to strike the ball identifies himself/herself by selecting from a menu on the monitor at the Hitspot.

A plurality of direction finding receivers 22*a*, 22*b*, . . . , 22*f* are set up on the driving range to receive the data from the wirelessly trackable golf ball 1. Direction finding receivers are networked and send the direction data and the received ball data to a server that, based on the data from several direction finding receivers, computes the location of the golf ball on the driving range.

System server 29 comprises a location server 26 that maintains a database of golf balls (identity) and their association with the Hitspot, player, game (golf course) and sends the location and identity information to the golf game application that has been paired with the golf ball. The golf game application may be running on the game controller 25P on the computer at the Hitspot or on another computer on the network. System server also comprises golf course data 28 and player data 27 for use during the game.

The system may also be installed on the putting green of the golf course. Direction finding receivers may be set up to cover the complete putting range. Direction information and the received signal strength are sent to the location server. The location server can detect each hit of the ball and report that information to the game controller. When the ball drops in the hole, the signal strength will drop due to the absorption of the signal by the surrounding earth. This, in combination with the ball's location close to the hole, allows the system to detect that the ball has been sunk. Alternatively, a detector in the hole can signal the presence of a ball.

In another embodiment, a player can obtain an RF tag using electronics similar to the electronics in the golf ball and attach it to one or more golf clubs. The player then can identify him- or her-self by presenting the club RF tag to the ball pairing interface. Also, various clubs can be identified with different tags. The system pairs the ball to the club that actually hits the ball, and to the player. This allows creating a data base with information about the performance of a player with his or her clubs like distance, hooking, slicing, etc. Patterns and trends will develop so that player can adapt or correct in order to get better results, and facilitate club choices when playing on a real or virtual golf course. In addition, if permanently attached to the club, the RF tag may also be used to identify club ownership.

Figure 4:
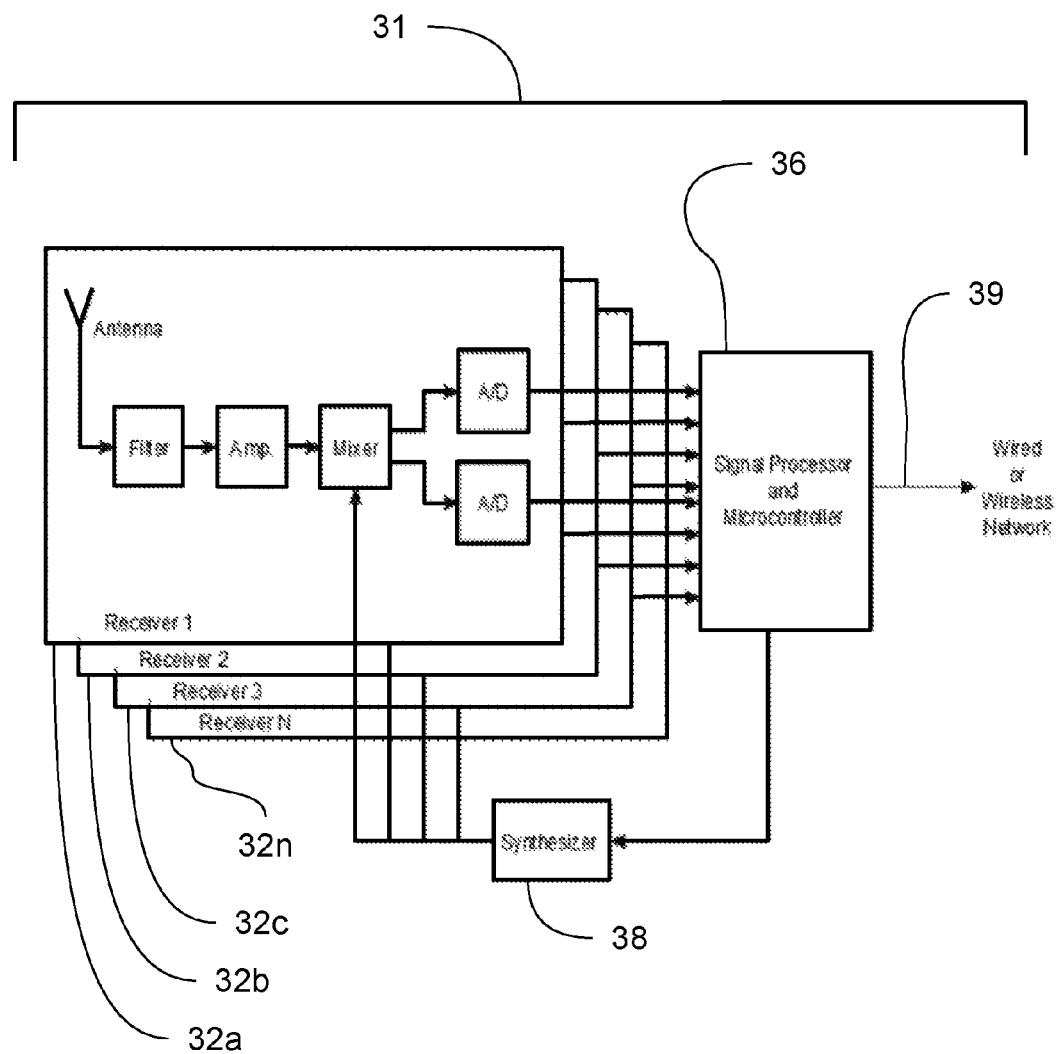
FIG. 4 shows an embodiment of a position determination unit in accordance with the present disclosure.

Turning now to FIG. 4, shown is an embodiment of a position determination unit 31 in accordance with the present disclosure. A plurality of direction finding receivers 32*a*, 32*b*, 32*c*, . . . , 32*n* are placed at precisely determined intervals around the driving range. In some embodiments, the phase shift of the received signal relative to each of the plurality of direction finding receivers is used to determine the time difference of arrival between the receivers and calculates the arrival angle of the received signal relative to the receiver positions. In other embodiments other direction finding schemes as documented in literature can be used to determine the angle. Time difference of arrival of received signals, and distance of the transmit signal from the receiver may each be used in embodiments to determine the location of the ball on the driving range. Synthesizer 38 and direction finding signal processor and micro-controller 36 are operable to control and interpret signals received from a plurality of trackable golf balls. Wired or wireless network 39 is operative to send and receive data from the direction finding unit to and from the location server.

In preferred embodiments, at least three direction finding receivers are located equidistant on a circle for the phase information and one reference receiver is located in the center of the circle. The reference receiver is the basis for the phase calculation and receiving the actual signal (identity and status information). The other receivers only have to provide phase information and do not need to be complete receivers.

Each direction finding receiver may contain an embedded microcomputer, memory, environmental sensors and signal processing functions to perform the computations required for the direction finding functions. Each direction finding receiver may also contain wired and/or wireless networking functions to transfer the information to the location server of the system. A direction finding receiver may be powered over wiring either dedicated wiring, power over Ethernet or other or can be powered by solar energy as is practically feasible.

Aspects of the operational flowchart and associated methods are now described. The system software consists of several applications and databases. Typically a hitspot processor and hitspot display at the driving location will implement the processes required to interact with the players at that location. The location server application maintains ball information data for each of the players on the driving range and correlates ball position data with the proper player application processes. The location server and ball information (Ball in Play) will be located on central system server in the system.

A database maintains membership status and golf results and unfinished game(s) by player. The membership status affects which type of game and what global interaction can be played. It could for instance be used to elevate the player status to a higher level depending on his activity level and results.

One or more of the following records may be kept in a player information database: membership status; handicap; statistics; games played; golf course; script; strokes (club, distance, ball id, weather conditions); game id; can be shared by multiple players and if shared the id will be identifiable as multiple player/tournament id.

One or more of the following records may be kept in a games database: database of available golf courses, either actual or fictitious, and scripts for the games to be played (various rules and scoring scripts, tournaments); golf courses; game & tournament scripts.

Operational software may be structured in various modules such that the system can be distributed over a number of physically separate computers as needed. A module for game user interface may contain: graphical front end for the game server module; user menus and inputs; graphical representation of the current game status; view of the golf course, looks up golf course data to calculate view; game scores and statistics; and ball pairing input, collects data of the ball presented to the ball pairing interface and pairs the data with the current active player. Sends the ball data to game server.

A game application module may comprise the following functionalities: one instance per player, set up such that it can interact with remote players; interacts with player database to collect status from other players and games database to compute game status; player login; game setup; available choices dependent on membership status of player; multiple player set up for games with multiple players; other players to log in have to look up that game in a list of current multiple player games for the same or remote locations; alternatively multiple player games can be set up at the club house desk or a tournament organizer; matching, equal level partners can be selected via "dating" sites with possibility to chat, for instance using a Facebook Application or other social media; set up record in player information database; record status information (strokes and ball position per player); sends ball pairing data to ball-in-play database; get data from ball location server; compute game status and send it to game user interface; update player information database with stroke data.

A location server module may comprise the following functionalities: get messages from the direction finding receivers and calculate ball position; maintains ball-in-play database; look up ball in ball-in-play database; create message with ball data (id, position and status information) and send it to the game server.

Any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" in the claims herein is not intended to invoke the provisions of 35 U.S.C. Section 112, Paragraph 6.

The invention claimed is:

1. A virtual golf system for use at a facility, the system comprising:
   a) a plurality of trackable golf balls, wherein each golf ball comprises:
      i) a radio frequency transmitter coupled to an antenna;
      ii) a radio frequency detector circuit coupled to said antenna;
      iii) a micro-controller coupled to both said transmitter and said detector circuit;
      iv) a power source for powering said transmitter, said detector circuit, and said micro-controller;
      v) each golf ball characterized in that said transmitter, said antenna, said detector circuit and said power source are encapsulated so that each of said golf balls has the appearance, size, weight and mechanical characteristics of a standard golf ball;
      vi) each golf ball further characterized in that each of said golf balls has an unactivated state characterized by low power consumption and an activated state, said activated state characterized in that said radio frequency detector circuit and said micro-controller are operative to receive radio frequency commands and said transmitter is operative to transmit golf ball identification data, wherein a portion of said golf ball identification data is unique to each of said plurality of trackable golf balls;
      vii) each golf ball further characterized in that said detector circuit is operative to respond to a predetermined electromagnetic pulse by switching from said unactivated state into said activated state;
   b) a plurality of at least three direction finding receivers, each of said direction finding receivers disposed in a known location about said facility; each direction finding receiver operative to receive via radio frequency reception said golf ball identification data and to measure a time of arrival of the incoming radio frequency reception;
   c) each of said direction finding receivers operative to transmit said golf ball identification data and said time of arrival via a communications network to a computing unit;
   d) said computing unit operative to receive from each of said plurality of direction finding receivers:
      i) said golf ball identification data;
      ii) said time of arrival; and,
      iii) said location data for each of the plurality of direction finding receivers,
      iv) and in response, said computing unit is further operative to compute a sequence of calculated positions for each of said plurality of trackable golf balls;
   e) said computing unit operative to communicate said sequence of calculated positions to a display, the display operative to update a visual representation of at least one of said calculated positions pertaining to at least one of said plurality of trackable golf balls.

2. The system of claim 1 further characterized in that: when in the activated state, each trackable golf ball is further operative to transmit said golf ball identification data at least as often as one time per second.

3. The system of claim 1 further characterized in that: when in the activated state, each trackable golf ball is further operative to transmit said golf ball identification data at least as often as one time per sixty seconds.

4. The system of claim 1 further characterized in that each trackable golf ball is further operative to autonomously transition, after a finite interval of time, from said active state into said inactive state.

5. The system of claim 3 further characterized in that said finite interval of time is no more than about five minutes.

6. The system of claim 1 further characterized in that the time interval between transmissions of said golf ball identification data is programmable.

7. The system of claim 4 further characterized in that the finite interval of time is programmable.

8. The system of claim 1 further comprising:
   a) a ball pairing interface operative to provide said predetermined electromagnetic pulse and thereby cause a trackable golf ball disposed in close proximity to transition into said activated state;
   b) the ball pairing interface further operative to receive ball identification data from said trackable golf ball;
   c) the ball pairing interface further operative to transmit data received from said trackable golf ball to a game controller that associates said trackable golf ball with at least one of: a specific player; a specific virtual golf game.

9. The system of claim 6 additionally comprising a game controller operative to:
   a) receive pairing data received from said ball pairing interface;
   b) associate a specific player with said pairing data;
   c) host a game of virtual golf in which the changing position of said trackable golf ball results in a change to what is visually displayed by said display.

10. The system of claim 1 further comprising:
    a) a ball pairing interface operative to provide said predetermined electromagnetic pulse and thereby cause a trackable golf ball disposed in close proximity to transition into said activated state;

b) the ball pairing interface further operative to receive ball identification data from said trackable golf ball;

c) the ball pairing interface further operative to transmit commands to said trackable golf ball;

d) the trackable golf ball further operative to respond to receiving said commands by at least one of: setting the time period between said periodic transmissions of said golf ball identification data; setting a time interval after the expiration of which the trackable golf ball transitions from said activated state into said unactivated state.

11. The system of claim 1 in which a trackable golf ball is further characterized in that: the power source is further configured as a rechargeable battery; the detector circuit is further operable to accept power via low frequency electromagnetic coupling and thereby recharge said rechargeable battery.

12. The system of claim 9 in which the trackable golf ball is further characterized in that: the detector interface further comprises a control interface; the control interface operative to activate the microprocessor while said rechargeable battery is recharging; said control interface operative to control the charging of said rechargeable battery.

13. The system of claim 1 wherein said display is a head mounted augmented reality display.

14. A virtual golf system for use at a facility, the system comprising:

a) a plurality of trackable golf balls, wherein each golf ball comprises:
i) a radio frequency transmitter coupled to an antenna;
ii) a radio frequency detector circuit coupled to said antenna;
iii) a micro-controller coupled to both said transmitter and said detector circuit;
iv) a power source for powering said transmitter, said detector circuit, and said micro-controller;
v) each golf ball characterized in that said transmitter, said antenna, said detector circuit and said power source are encapsulated so that each of said golf balls has the appearance, size, weight and mechanical characteristics of a standard golf ball;
vi) each golf ball further characterized in that each of said golf balls has an unactivated state characterized by low power consumption and an activated state, said activated state characterized in that said radio frequency detector circuit and said micro-controller are operative to receive radio frequency commands and said transmitter is operative to transmit golf ball identification data, wherein a portion of said golf ball identification data is unique to each of said plurality of trackable golf balls;
vii) each golf ball further characterized in that said detector circuit is operative to respond to a predetermined electromagnetic pulse by switching from said unactivated state into said activated state;

b) a plurality of at least three direction finding receivers, each of said direction finding receivers disposed in a known location about said facility; each direction finding receiver operative to receive via radio frequency reception said golf ball identification data and to measure a received phase of the incoming radio frequency reception;

c) each of said direction finding receivers operative to transmit said golf ball identification data and said received phase via a communications network to a computing unit;

d) said computing unit operative to receive from each of said plurality of direction finding receivers:
i) said golf ball identification data;
ii) said received phase; and,
iii) said location data for each of the plurality of direction finding receivers,
iv) and in response, said computing unit is further operative to compute a sequence of calculated positions for each of said plurality of trackable golf balls;

e) said computing unit operative to communicate said sequence of calculated positions to a display, the display operative to update a visual representation of at least one of said calculated positions pertaining to at least one of said plurality of trackable golf balls.

15. A virtual golf system for use at a facility, the system comprising:

a) a plurality of trackable golf balls, wherein each golf ball comprises:
i) a radio frequency transmitter coupled to an antenna;
ii) a detector circuit coupled to said antenna;
iii) a micro-controller coupled to both said transmitter and said detector circuit;
iv) a power source for powering said transmitter, said detector circuit, and said micro-controller;
v) each golf ball characterized in that said transmitter, said antenna, said detector circuit and said power source are encapsulated so that each of said golf balls has the appearance, size, weight and mechanical characteristics of a standard golf ball;
vi) each golf ball further characterized in that each of said golf balls has an unactivated state characterized by low power consumption and an activated state, said activated state characterized in that said radio frequency detector circuit and said micro-controller are operative to receive radio frequency commands and said transmitter is operative to transmit golf ball identification data, wherein a portion of said golf ball identification data is unique to each of said plurality of trackable golf balls;
vii) each golf ball further characterized in that said detector circuit is operative to respond to a predetermined electromagnetic pulse by switching from said unactivated state into said activated state;
viii) each trackable golf ball further operable to periodically transmit golf ball identification data;

b) a plurality of at least three direction finding receivers, each of said direction finding receivers disposed in a known location about said facility; each direction finding receiver operative to receive via radio frequency reception said golf ball identification data and to measure the direction from which said golf ball identification data was received;

c) each of said direction finding receivers operative to transmit said golf ball identification data and said direction data via a communications network to a computing unit;

d) said computing unit operative to receive from each of said plurality of direction finding receivers:
i) said golf ball identification data;
ii) said direction data; and
iii) said location data for each of the plurality of direction finding receivers, iv) and in response, said computing unit is further operative to compute a sequence of calculated positions for each of said plurality of trackable golf balls;
e) said computing unit operative to communicate said sequence of calculated positions to a display, the display operative to update a visual representation of at least one of said calculated positions pertaining to at least one of said plurality of trackable golf balls.

16. The system of claim 1 further comprising:
a) a hitspot comprising one or more terrain features from the list consisting of {fairway, rough, sand, putting green};
b) said hitspot disposed within said facility such that golf strokes executed from said hitspot result in each of said plurality of trackable golf ball remaining within an operational range of said plurality of direction finding receivers.

17. The system of claim 14 further characterized in that:
a) the hitspot has a putting green terrain feature;
b) said putting green terrain feature has a conventional recessed hole extending below the surface of said putting green adapted to accept said trackable golf ball;
c) at least one of said plurality of direction finding receivers further operative to detect a substantial drop in transmitted signal strength from said trackable golf ball when said ball drops into said recessed hole.

* * * * *